United States Patent [19]
Weightman

[11] Patent Number: 5,509,866
[45] Date of Patent: Apr. 23, 1996

[54] EPICYCLICAL GALACTIC CLUSTER GEARING SYSTEM

[75] Inventor: Gerald N. Weightman, Rockford, Ill.

[73] Assignee: Univerg Research Netwerg, Ltd., Rockford, Ill.

[21] Appl. No.: 266,690

[22] Filed: Jun. 28, 1994

[51] Int. Cl.[6] .............................. F16H 3/50; F16H 3/56; F16H 3/68

[52] U.S. Cl. .................... 475/343; 475/9; 475/336; 475/346; 475/904; 74/665 C; 74/665 GB; 74/665 GC

[58] Field of Search ................ 475/9, 331, 336, 475/343, 346, 347, 904; 74/395, 665 C, 665 GB, 665 GC

[56] References Cited

U.S. PATENT DOCUMENTS

| | | | |
|---|---|---|---|
| 1,766,765 | 6/1930 | Savonius . | |
| 1,820,529 | 8/1931 | Darrieus . | |
| 2,969,696 | 1/1961 | Fraga | 475/9 |
| 3,011,062 | 11/1961 | Goldsmith . | |
| 3,563,104 | 2/1971 | Schuster | 74/395 |
| 3,683,875 | 8/1972 | Chadwick | 74/395 X |
| 3,762,698 | 10/1973 | Thomas | 74/395 X |
| 4,038,821 | 8/1977 | Black | 60/398 |
| 4,095,422 | 6/1978 | Kurakake | 60/398 |
| 4,115,027 | 9/1978 | Thomas | 415/53.1 |
| 4,115,028 | 9/1978 | Hintze | 415/151 |
| 4,158,780 | 6/1979 | Wood | 290/42 |
| 4,306,513 | 12/1981 | Legrand | 475/336 X |
| 4,792,279 | 12/1988 | Bergeron | 416/89 |
| 5,379,736 | 1/1995 | Anderson | 123/204 |

FOREIGN PATENT DOCUMENTS

| | | | |
|---|---|---|---|
| 2839198 | 3/1980 | Germany | 475/9 |
| 3312000 | 10/1984 | Germany . | |
| 3518516 | 11/1986 | Germany . | |
| 757716 | 9/1956 | United Kingdom | 74/665 GC |
| 1360041 | 7/1974 | United Kingdom . | |

OTHER PUBLICATIONS

"Wind/Water Energy Converter." Nasa Tech Briefs, Winter 1978.
Chase, Victor. "13 Wind Machines." Popular Science, Nov. 1978.
Roberts, R. "Variable Geometry Vertical Axis Wind Turbine." Engineering Review. Canada, Nov. 1987.

Primary Examiner—Charles A. Marmor
Assistant Examiner—Nathan O. Jensen

[57] ABSTRACT

An epicyclical system of miter, bevel, worm and spur gears, plus joining members that may be adapted to, or be embodied in, a wide variety of devices in the field of applied mechanics including, but not limited to: (a) absorption of energy from fluid streams, (b) timing and tracking mechanisms, (c) mechanical power transmission; (d) generation of uniform or intermittent sine wave velocities in a multitude of helicoid patterns.

3 Claims, 6 Drawing Sheets

1

EPICYCLICAL GALACTIC CLUSTER GEARING SYSTEM

BACKGROUND

1. Field of Invention

This invention relates to a system of gearing that was originally designed to boa timing mechanism which precisely controls the optimal angular relationship of 3 panemone spools that are an integral part of a wind driven cyclegyro turbine wheel

2. Description of Prior Art

Through both theoretical calculation and empirical experiment it was found that the optimum orbital pathway for panemone type spools used for absorbing energy in a fluid stream is a Limacon helicoid. This pathway, or filigree, was first formulated by Blaise Pascal in the early 17th century solely for the purpose of demonstrating the prodigious contribution Rene Des Cartes was making to science in originating the x - y coordinate grid system.

Mechanical systems which have previously been used to attain this filigree, and other cyclegyro pathways, in the absorption of energy, or for propulsion, in a fluid stream have utilized a variety of cams, rods, levers, one-way clutches, gears, racks, chains, sprockets, belts and pulleys. The resulting devices have been quite complicated, unreliable and oftentimes clumsy.

While constructing physical models of this unique system of miter and bevel gears it was soon discovered that by merely reversing the position of one gear in each train, or by altering the ratio steps, a wide variety of other helicoid patterns resulted. These other patterns, or filigrees, were recognized as also having usefulness in distinct fields other than wind turbines, and so the system was expanded beyond its original expression so it could be utilized in a wide variety of new industrial, commercial, agricultural and household products.

REFERENCE NUMERALS IN DRAWINGS

| | |
|---|---|
| 10 | lunar spur gear or toothed spline member |
| 11 | pinion spur gear |
| 12 | ring gear |
| 13 | tubular protruding connecting means |
| 14 | tool holding means |
| 15 | stationary support means |
| 21 | Alpha miter or bevel gear |
| 22 | Merak miter or bevel gear |
| 23 | Achates miter or bevel gear |
| 24a | Perisellis Major satellite miter or bevel gear |
| 24b | Perisellis Minor satellite miter or bevel gear |
| 25 | tentacled support member |
| 26 | connecting joint string |
| X | proximate end of connecting joint string 26 |
| Y | distal end of connecting joint string 26 |
| 27 | independent gear train |
| 28 | worm gear member |
| 29 | worm member |

Figure 1:
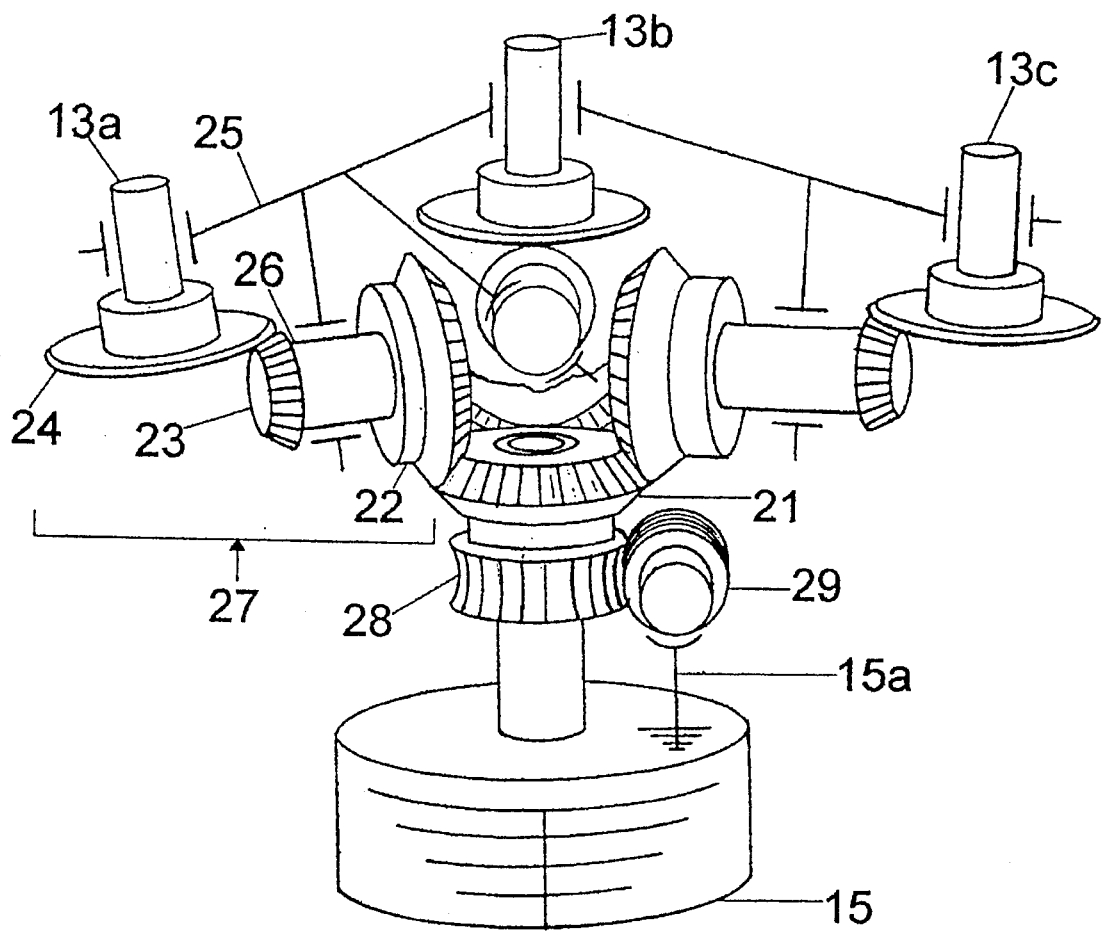
FIG. 1 is a schematic perspective view of the timing mechanism used to orient 3 panemone spools in an orbital Limaconic relationship to an oncoming fluid stream. It comprises: stationary support means 15; Alpha miter gear 21 journaled about said stationary support means 15; worm gear member 28 fixed to, and having its central axis conjunctive with, said Alpha miter gear 21; worm member 29 being in intimate mesh with said worm gear member 28; stationary support member 15a fixed to said stationary support member 15 and giving journaled support to worm member 29; a plurality of independent gear trains 27, each said independent gear train 27 having Merak miter gear 22 in intimate mesh with said Alpha miter gear 21; Achates bevel gear 23; connecting joint string 26 having its proximate end X rigidly fixed to said Merak miter gear 22 and having its distal end Y rigidly fixed to said Achates bevel gear 23; Perisellis Major satellite bevel gear 24a in intimate mesh with said Achates bevel gear 23; tubular protruding connecting means 13 rigidly fixed to, and having its central axis conjunctive with the central axis of said Perisellis Major satellite bevel gear 24a; tentacled support member 25.
Figure 2:
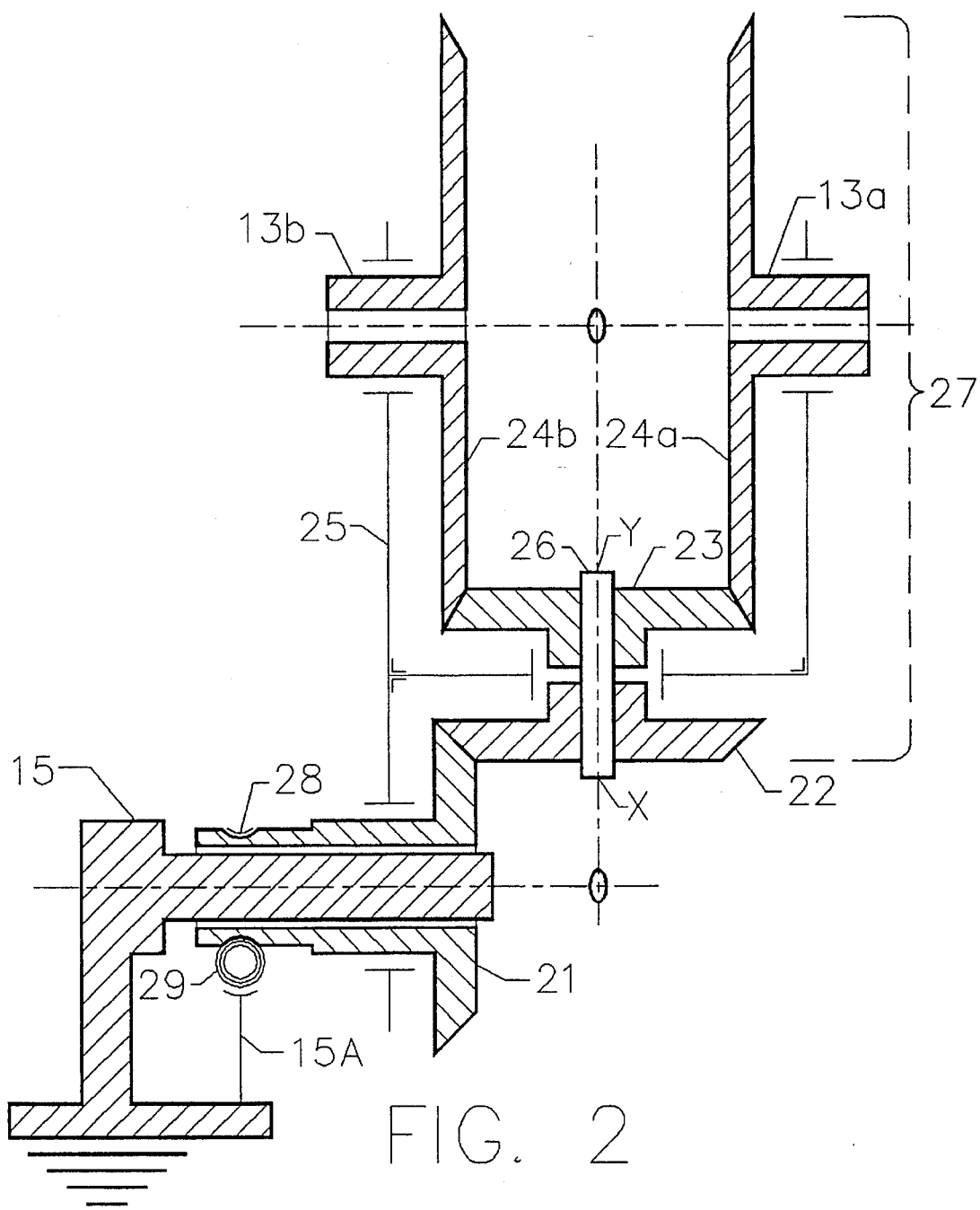
FIG. 2 is a schematic sectional layout of a single train of miter, bevel and worm gears in an elementary form of an epicyclical galactic cluster system. It comprises: stationary support means 15; Alpha miter or bevel gear 21 journaled about said stationary support means 15; worm gear member 28 fixed to and having its central axis conjunctive with said Alpha miter or bevel gear 21; worm member 29 being in intimate mesh with said worm gear member 28; stationary support member 15a fixed to said stationary support member 15 and giving journaled support to worm member 29; a plurality of independent gear trains 27, each said independent gear train 27 having Merak miter or bevel gear 22 in intimate mesh with said Alpha miter or bevel gear 21; Achates miter or bevel gear 23; connecting joint string 26 having its proximate end X rigidly fixed to said Merak miter or bevel gear 22 and having its distal end Y rigidly fixed to said Achates miter or bevel gear 23; Perisellis Major satellite miter or bevel gear 24a in intimate mesh with said Achates miter or bevel gear 23; tubular protruding connecting means 13a rigidly fixed to and having its central axis conjunctive with the central axis of said Perisellis Major satellite miter or bevel gear 24a; Perisellis Minor satellite miter or bevel gear 24b in intimate mesh with said Achates miter or bevel gear 23; tubular protruding connecting means 13b rigidly fixed to, and having its central axis conjunctive with, the central axis of said Perisellis Minor satellite miter or bevel gear 24b; tentacled support member 25.
Figure 3:
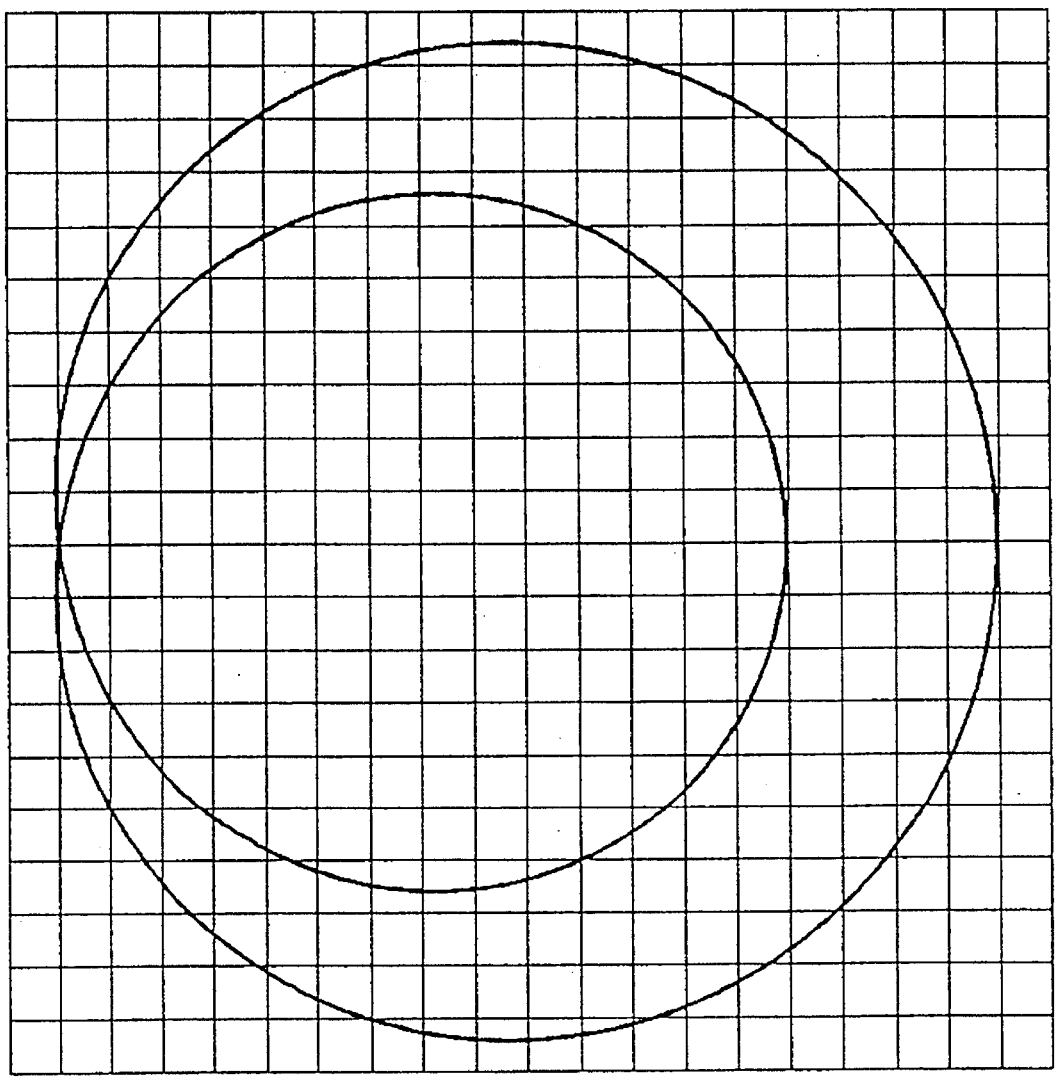
FIG. 3 depicts the helicoid path that any point located on a plane perpendicularly transverse to the central axis of Perisellis Major satellite bevel gear 24a will follow if the progressive train ratio through gears 21, 22, 23, and 24a is 1:1:1:2 with Alpha miter gear 21 being grounded while tentacled support member 25 is allowed to rotate. The helicoid path in FIG. 3 is commonly known in the study of mathematics as: "the Limacon of Pascal".
Figure 4:
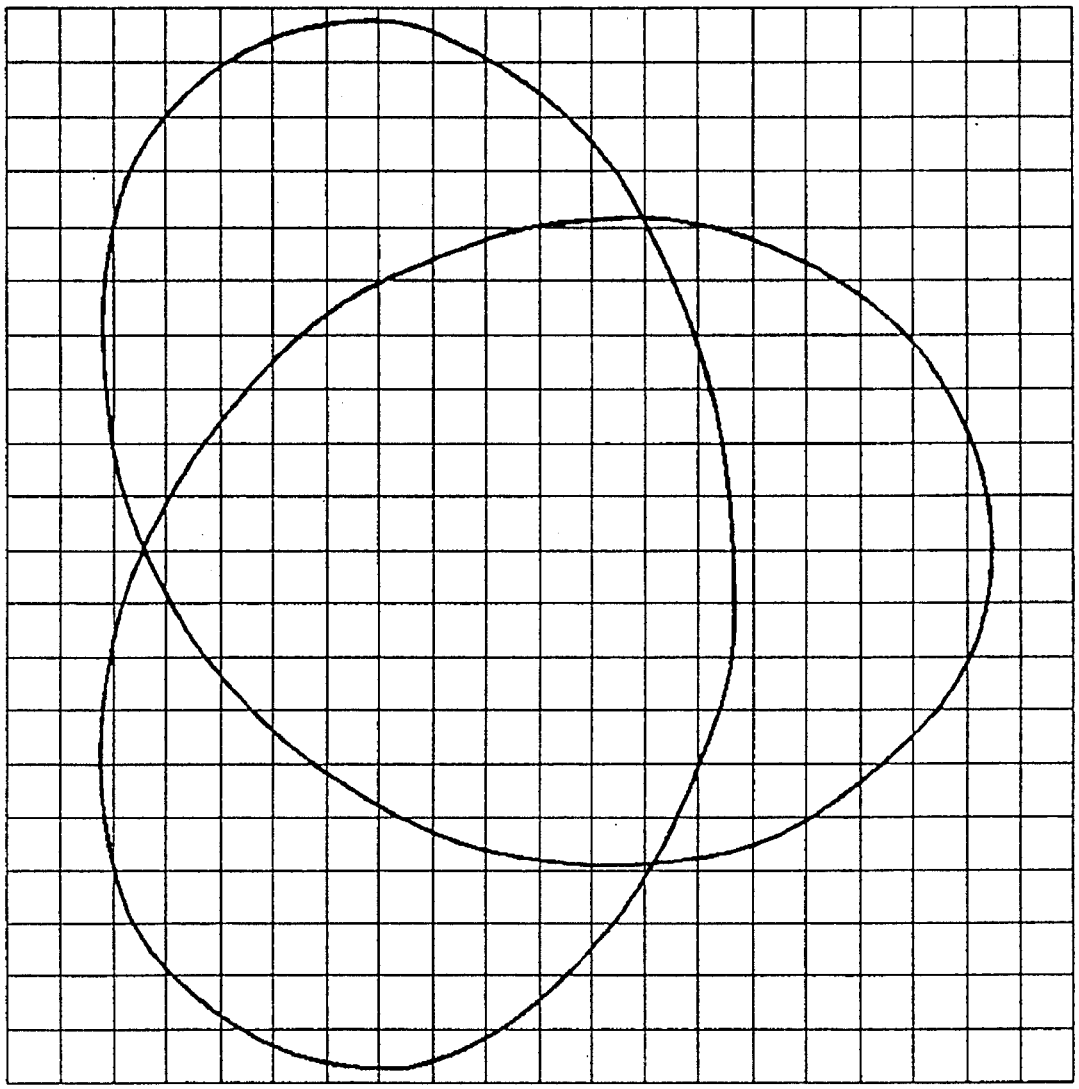
FIG. 4 depicts the helicoid path that any point located on a plane perpendicularly transverse to the central axis of Perisellis Minor satellite bevel gear 24b will follow if the progressive train ratio through gears 21, 22, 23, and 24b is 1:1:1:2 with Alpha miter gear 21 being grounded while tentacled support member 25 is allowed to rotate. The helicoid path in FIG. 4 is commonly known in the study of mathematics as a "trochoid" or as a "three leaf rose" planar curve.

Embodied mechanisms based on the present invention as depicted in FIG. 1 may function as an energy absorber. With the single Alpha miter gear 21 held stationary tangential force applied through panemones rigidly attached to tubular protruding connecting means 13a, 13b and 13c will enable rotating mechanical power to be taken from the tentacled support member 25. The said single Alpha miter gear 21, although normally held stationary, may be rotated in either clockwise or counter-clockwise direction by means of a stepping motor, or other appropriate means, controlling the worm gear set 28 and 29 in order to vary the attack angle of the panemones in relation to the direction of the oncoming fluid stream. This inherent feature in the system provides that the output velocity, as well as the direction of rotation, of the said tentacled support member 25 may be governed when the embodied mechanism is utilized to absorb energy from a variable velocity fluid stream.

Figure 5:
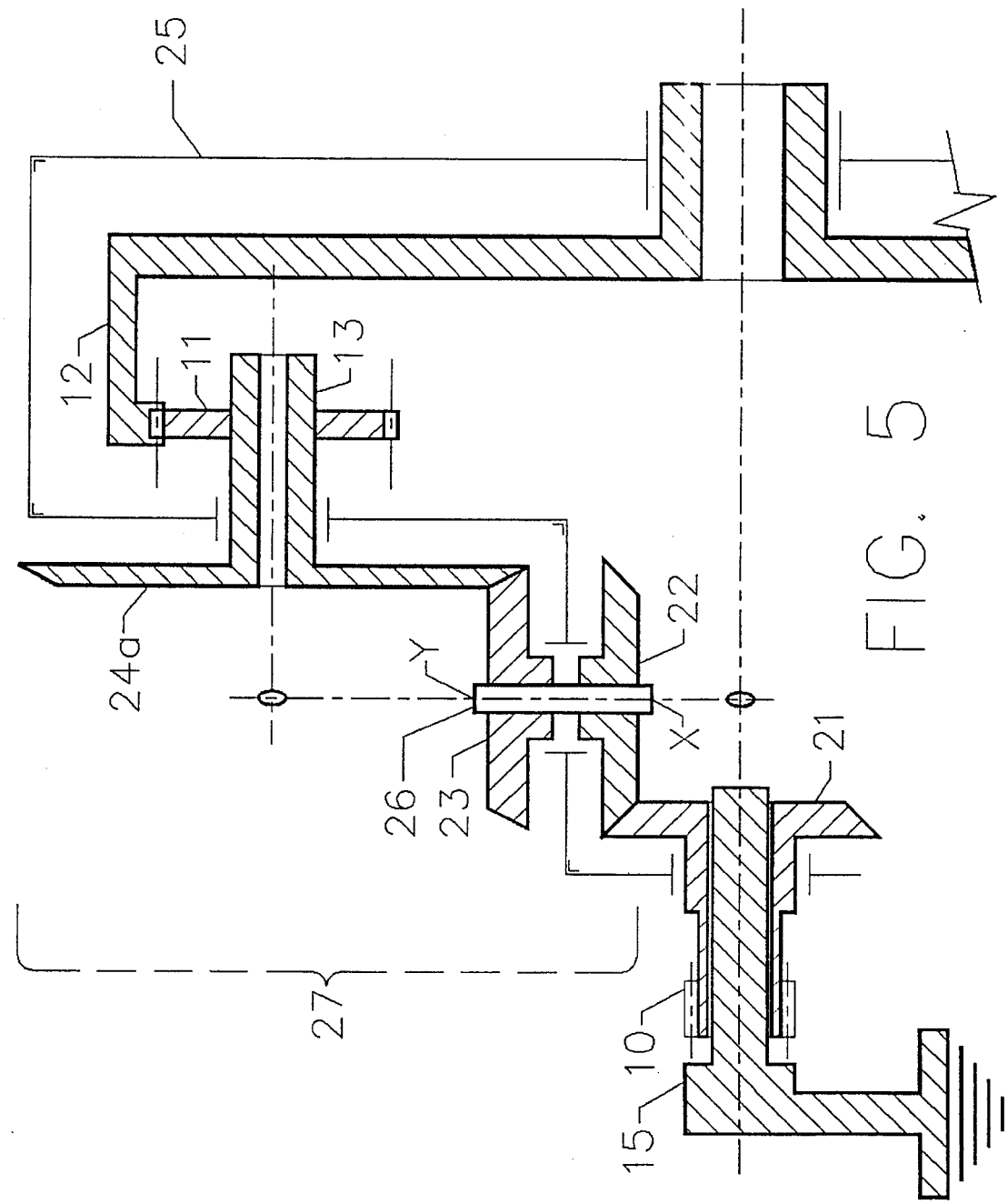
FIG. 5 is a schematic sectional layout of a single train of miter, bevel and spur gears in a second expression of an epicyclical galactic cluster system. It comprises: stationary support means 15; Alpha miter or bevel gear 21 journaled about said stationary support means 15; lunar spur gear or toothed spline member 10 fixed to and having its central axis conjunctive with the central axis of said Alpha miter or bevel gear 21; a plurality of independent gear trains 27 each said independent gear train 27 having Merak miter or bevel gear 22 in intimate mesh with said Alpha miter or bevel gear 21; having proximate end X of connecting joint string 26 rigidly fixed to said Merak miter or bevel gear 22 and having distal end Y rigidly fixed to Achates miter or bevel gear 23; having Perisellis Major satellite miter or bevel gear 24a in intimate mesh with said Achates miter or bevel gear 23; tubular protruding connecting means 13 rigidly fixed to and having its central axis conjunctive with the central axis of said Perisellis Major satellite miter or bevel gear 24a; spur gear 11 rigidly fixed to and having its central axis conjunctive with the central axis of said tubular protruding connecting means 13; ring gear 12 in intimate mesh with said spur gear 11 and having its central axis conjunctive with the central axis of said Alpha miter or bevel gear 21.

Embodied mechanisms based on the present invention as depicted in FIG. 5 may function as a mechanical power transmitter. With the single Alpha miter or bevel gear 21 held stationary, a rotating force applied to tentacled support member 25 will result in rotating power being transmitted to a plurality of spur gears 11 and thence to the ring gear 12.

Embodied mechanisms based on the present invention as depicted in FIG. 5 may function as a mechanical power transmitter. With the tentacled support member 25 held stationary a rotating force applied to the single Alpha miter or bevel gear 21 will result in mechanical power being transferred to a plurality of spur gears 11 and thence to the ring gear 12.

Embodied mechanisms based on the present invention as depicted in FIG. 5 may function as a mechanical power transmitter. With the single Alpha miter or bevel gear 21 held stationary, a rotating force applied to the ring gear 12 will result in mechanical power being transferred to the Perisellis Major satellite miter or bevel gears 24a and thence to the tentacled support member 25.

Embodied mechanisms based on the present invention as depicted in FIG. 5 may function as a mechanical power transmitter. With tentacled support member 25 held stationary a rotating force applied to the ring gear 12 will result in mechanical power being transferred to the single Alpha miter or bevel gear 21.

Figure 6:
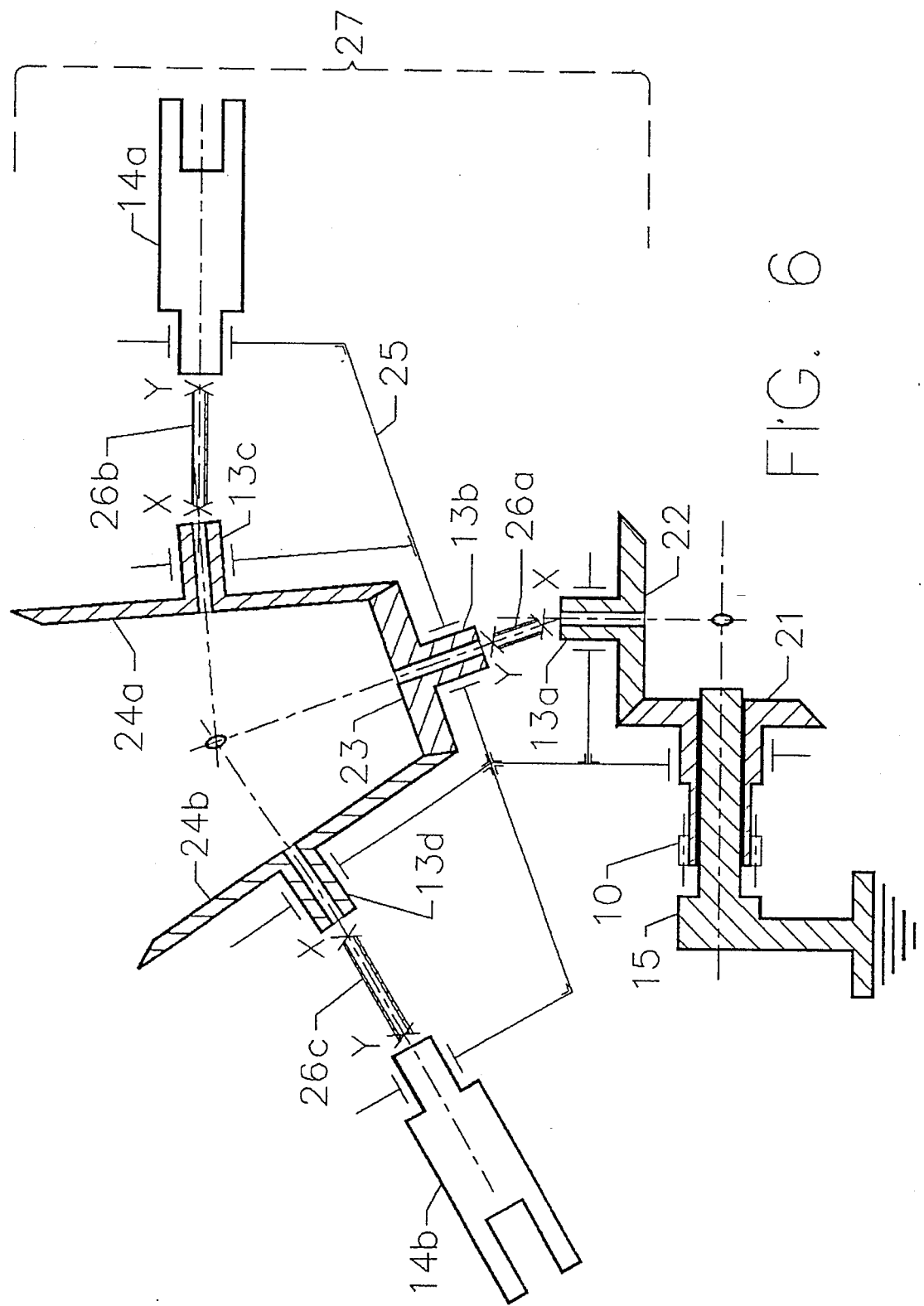
FIG. 6 is a schematic sectional layout of a single train of miter, bevel and spur gears in yet a third expression of an epicyclical galactic cluster system. It comprises: stationary support means 15; Alpha miter or bevel gear 21 journaled about said stationary support means 15; lunar spur gear or tooth spline member 10 fixed to and having its central axis conjunctive with the central axis of said Alpha miter or bevel gear 21; a plurality of independent gear trains 27 each said gear train 27 having Merak miter or bevel gear 22 in intimate mesh with said Alpha miter or bevel gear 21; tubular protruding connecting means 13a rigidly fixed to and having its central axis conjunctive with the central axis of said Merak miter or bevel gear 22; Achates miter or bevel gear 23; tubular protruding connecting means 13b rigidly fixed to and having its central axis conjunctive with central axis of said Achates miter or bevel gear 23; connecting joint string 26a having its proximate end X rigidly fixed to central axis of said tubular protruding connecting means 13a and having its distal end Y rigidly fixed to central axis of said tubular protruding connecting means 13b; Perisellis Major satellite miter or bevel gear 24a in intimate mesh with said Achates miter or bevel gear 23; tubular protruding connecting means 13c rigidly fixed to and having its central axis conjunctive with the central axis of Perisellis Major satellite miter or bevel gear 24a; tool holder 14a; connecting joint string 26b having its proximate end X rigidly fixed to central axis of said tubular connecting means 13c and having its distal end Y rigidly fixed to central axis of said tool holder 14a; connecting joint string 26b having its proximate end X rigidly fixed to central axis of said tubular connecting means 13c and having its distal end Y rigidly fixed to central axis of said tool holder 14a; Perisellis Minor satellite miter or bevel gear 24b in intimate mesh with said Achates miter or bevel gear 23; tubular protruding member 13d rigidly fixed to said Perisellis Minor satellite miter or bevel gear 24b and having its central axis conjunctive with the central axis of said Perisellis Minor satellite miter or bevel gear 24b; tool holder 14b; connecting joint string 26c having its proximate end X rigidly fixed to central axis of said tubular connecting means 13d and having its distal end Y rigidly fixed to central axis of tool holder 14b.

The arrangement of oblique angle bevel gears depicted in FIG. 6 could be usefully employed in the transmission of rotating mechanical power in a machining head having an array of angularly deployed tools.

A multitude of ratios may be designed into the independent gear trains 27 of an embodied mechanism.

Spiral miter and bevel gears are preferred in any embodiment of the present invention so as to more conveniently maintain accuracy and enhance efficiency of the system.

While the basic principles of the present invention have been described as a system useful in numerous embodiments, the skilled person will understand that the scope of the invention allows for many alternate configurations and it is not limited to the drawing figures shown in this disclosure.

What I claim is:

1. An epicyclical galactic cluster gearing system comprising:

generally tubular stationary support member;

single miter or bevel gear journaled about the central axis of said stationary support member;

single worm gear member rigidly attached to and having its central axis conjunctive with the central axis of said single miter or bevel gear;

single worm member intimately meshed with said single worm gear member;

second stationary support member journaled about the central axis of said single worm member;

a plurality of independent gear trains each said independent gear train having a proximate second miter or bevel gear generally perpendicularly intimately meshed with said single miter or bevel gear;

a distal third miter or bevel gear having its central axis conjunctive with, parallel with, or at crossing axis with said second miter or bevel gear;

a connecting joint string joining said proximate second miter or bevel gear about its central axis with the central axis of said distal third miter or bevel gear;

a fourth miter or bevel gear generally perpendicularly intimately meshed with said distal third miter or bevel gear;

a generally tubular protruding connecting means emanating from rear face of said fourth miter or bevel gear whereby the central axis of said tubular protruding connecting means is conjunctive with the central axis of said fourth miter or bevel gear;

a rotatable tentacled support member having its central axis conjunctive with the central axis of said single miter or bevel gear whereby said tentacled support member gives journaled support to single miter or bevel gear and to pluralities of independent gear trains.

2. An epicyclical galactic cluster system of miter, bevel and spur gears comprising:

a generally tubular stationary support member;

a single miter or bevel gear journaled about the central axis of said stationary support member;

a lunar spur gear or a toothed spline member rigidly attached to, and having its central axis conjunctive with, the central axis of said central axis of single miter or bevel gear;

a plurality of independent gear trains each said independent gear train having a proximate second miter or bevel gear generally perpendicularly intimately meshed with said single miter or bevel gear;

a distal third miter or bevel gear having its central axis conjunctive with, parallel with, or at crossing axis with said second miter or bevel gear;

a connecting joint string joining said proximate second miter or bevel gear about its central axis with the central axis of said distal third miter or bevel gear;

a fourth miter or bevel gear generally perpendicularly intimately meshed with said distal third miter or bevel gear;

a generally tubular protruding connecting means emanating from rear face of said fourth miter or bevel gear whereby the central axis of said tubular protruding means is conjunctive with the central axis of said fourth miter or bevel gear;

a plurality of pinion spur gears whereby the central axis of each said pinion spur gear is conjunctive with and rigidly fixed about the central axis of each said tubular protruding connecting means;

a ring gear having its central axis conjunctive with the central axis of said single miter or bevel gear and having its gear teeth in parallel axis and in intimate mesh with each of said plurality of pinion spur gears;

a rotatable tentacted support member having its central axis conjunctive with the central axis of said single miter or bevel gear whereby said tentacled support member gives journaled support to said single miter or bevel gear, to said plurality of independent gear trains, to said plurality of said pinion spur gears and to said ring gear.

3. An epicyclical galactic cluster system of bevel and spur gears comprising:

a generally tubular stationary support member;

a single bevel gear journaled about the central axis of said stationary support member;

a lunar spur gear or a toothed splined member rigidly attached to and having its central axis conjunctive with the central axis of said single bevel gear;

a plurality of independent gear trains each said independent gear train having a proximate second bevel gear generally perpendicularly intimately meshed with said single bevel gear;

a first generally tubular protruding connecting means emanating from the rear face of said proximate second bevel gear whereby the central axis of said first tubular protruding connecting means is conjunctive with the central axis of said proximate second bevel gear;

a distal third bevel gear having its central axis conjunctive with, parallel with, or at crossing axis with said second bevel gear;

a second generally tubular protruding connecting means emanating from the rear face of said distal third bevel gear whereby the central axis of said second tubular protruding connecting means is conjunctive with the central axis of said distal third bevel gear;

a first connecting joint string rigidly joining the central axis of said first tubular connecting means with the central axis of said second tubular connecting means;

a fourth bevel gear generally obtusely intimately meshed with said distal third bevel gear; a third generally tubular protruding connecting means emanating from the rear face of said fourth bevel gear whereby the central axis of said third tubular connecting means is conjunctive with the central axis of said fourth bevel gear;

a first tool holding means having its central axis conjunctive with, parallel with, or at crossing axis with the central axis of said third tubular protruding connecting means;

a second connecting joint string whereby its proximate end is rigidly joined to the central axis of said third tubular protruding connecting means and its distal end is rigidly joined to the central axis of said first tool holding means;

a fifth bevel gear generally obtusely intimately meshed with said distal third bevel gear, a fourth generally tubular protruding connecting means emanating from the rear face of said fifth bevel gear whereby the central axis of said fourth tubular connecting means is conjunctive with the central axis of said fifth bevel gear;

a second tool holding means having its central axis conjunctive with, parallel with, or at crossing axis with the central axis of said fourth tubular protruding connecting means;

a third connecting joint string whereby its proximate end is rigidly joined to the central axis of said fourth tubular protruding connecting means and its distal end is rigidly joined to central axis of said second toolholding means;

a rotatable tentacled support member having its central axis conjunctive with the central axis of said single bevel gear whereby said tentacled support member gives journaled support to said single bevel gear and to said plurality of independent gear trains.

* * * * *